(12) United States Patent
Tanaka et al.

(10) Patent No.: US 10,348,164 B2
(45) Date of Patent: Jul. 9, 2019

(54) MOTOR WITH SPEED REDUCTION MECHANISM

(71) Applicant: Mitsuba Corporation, Kiryu-shi, Gunma (JP)

(72) Inventors: Hiroto Tanaka, Kiryu (JP); Takeshi Kanai, Kiryu (JP); Masaaki Kimura, Kiryu (JP); Koji Tsuchiya, Kiryu (JP)

(73) Assignee: Mitsuba Corporation, Kiryu-shi, Gunman (JP)

( * ) Notice: Subject to any disclaimer, the term of this patent is extended or adjusted under 35 U.S.C. 154(b) by 0 days.

(21) Appl. No.: 15/958,064

(22) Filed: Apr. 20, 2018

(65) Prior Publication Data

US 2018/0248448 A1 Aug. 30, 2018

Related U.S. Application Data

(63) Continuation of application No. 14/638,502, filed on Mar. 4, 2015, now Pat. No. 9,979,261, which is a continuation of application No. 13/387,560, filed as application No. PCT/JP2010/062544 on Jul. 26, 2010, now Pat. No. 9,000,634.

(30) Foreign Application Priority Data

Jul. 30, 2009 (JP) ................................ 2009-178154

(51) Int. Cl.
| | |
|---|---|
| *H02K 9/28* | (2006.01) |
| *H02K 5/14* | (2006.01) |
| *H02K 7/116* | (2006.01) |
| *H02K 13/00* | (2006.01) |
| *H02K 5/18* | (2006.01) |
| *H02K 11/33* | (2016.01) |

(52) U.S. Cl.
CPC .............. *H02K 9/28* (2013.01); *H02K 5/148* (2013.01); *H02K 7/1166* (2013.01); *H02K 13/006* (2013.01); *H02K 5/18* (2013.01); *H02K 11/33* (2016.01)

(58) Field of Classification Search
CPC .......... H02K 4/148; H02K 5/225; H02K 9/28; H02K 7/1166
See application file for complete search history.

(56) References Cited

U.S. PATENT DOCUMENTS

| | | | |
|---|---|---|---|
| 6,218,755 | B1 | 4/2001 | Tanaka et al. |
| 6,452,297 | B2 | 9/2002 | Yamamoto et al. |
| 6,734,589 | B2 | 5/2004 | Kogure et al. |
| 7,471,021 | B2 | 12/2008 | Yagi et al. |

(Continued)

FOREIGN PATENT DOCUMENTS

| | | |
|---|---|---|
| CN | 101272027 A | 9/2008 |
| CN | 202364062 U | 8/2012 |

(Continued)

*Primary Examiner* — Dang D Le
(74) *Attorney, Agent, or Firm* — McCormick, Paulding & Huber LLP

(57) ABSTRACT

In a brush holder accommodating part 26*d* of a gear housing 26, paired flat surface parts 26*c* and paired curved parts 26*b* are alternately disposed so as to be formed into an elliptical shape, one of the paired flat surface parts is formed with first heat sinks 26*i*, and two brushes 20 and 20 mounted on a brush holder unit 19 accommodated in the brush holder accommodating part 26*d* are disposed near the first heat sinks 26*i*.

16 Claims, 13 Drawing Sheets

(56) References Cited

U.S. PATENT DOCUMENTS

| | | | |
|---|---|---|---|
| 7,714,472 B2 | 5/2010 | Kuroda | |
| 9,000,634 B2* | 4/2015 | Tanaka | H02K 5/148 |
| | | | 310/64 |
| 9,525,322 B2 | 12/2016 | Okabe et al. | |
| 9,979,261 B2* | 5/2018 | Tanaka | H02K 5/148 |
| 2005/0280323 A1 | 12/2005 | Amagasa | |
| 2006/0226802 A1 | 10/2006 | Marentette | |
| 2007/0164621 A1 | 7/2007 | Kano et al. | |

FOREIGN PATENT DOCUMENTS

| | | |
|---|---|---|
| DE | 10153173 A1 | 10/2002 |
| DE | 102005040647 A1 | 3/2007 |
| DE | 102005052675 A1 | 5/2007 |
| DE | 102006060621 A1 | 6/2008 |
| DE | 102008001359 A1 | 10/2009 |
| DE | 102008029463 A1 | 12/2009 |
| DE | 102008042250 A1 | 4/2010 |
| DE | 102008049369 A1 | 4/2010 |
| DE | 102009047567 A1 | 5/2011 |
| EP | 1081829 A1 | 3/2001 |
| EP | 1968169 A2 | 9/2008 |
| EP | 2461464 A1 | 6/2012 |
| FR | 2699760 A1 | 6/1994 |
| FR | 2865981 A1 | 8/2005 |
| JP | H0662776 | 9/1994 |
| JP | 2004159392 A | 6/2004 |
| JP | 2004320879 A | 11/2004 |
| JP | 2005094821 A | 4/2005 |
| JP | 2005094822 A | 4/2005 |
| JP | 2005168133 A | 6/2005 |
| JP | 2005176420 A | 6/2005 |
| JP | 2005184892 A | 7/2005 |
| JP | 2006353019 A | 12/2006 |
| JP | 2007097352 A | 4/2007 |
| JP | 2007116829 A | 5/2007 |
| JP | 2007124792 A | 5/2007 |
| JP | 2007143208 A | 6/2007 |
| JP | 2007143278 A | 6/2007 |
| JP | 2008131800 A | 6/2008 |
| JP | 2008148394 A | 6/2008 |
| JP | 2008160941 A | 7/2008 |
| JP | 2008178247 A | 7/2008 |
| JP | 2008206373 A | 9/2008 |
| JP | 2008236979 A | 10/2008 |
| JP | 2008253049 A | 10/2008 |
| JP | 2008253086 A | 10/2008 |
| JP | 2008253137 A | 10/2008 |
| JP | 2008259278 A | 10/2008 |
| JP | 2008290615 A | 12/2008 |
| JP | WO2006115092 A1 | 12/2008 |
| JP | 2009033956 A | 2/2009 |
| JP | 2009113555 A | 5/2009 |
| JP | 2009119986 A | 6/2009 |
| JP | 2009119987 A | 6/2009 |
| JP | 2009119988 A | 6/2009 |
| JP | 2009171734 A | 7/2009 |
| JP | 2009189093 A | 8/2009 |
| JP | 2009201176 A | 9/2009 |
| JP | 2009201277 A | 9/2009 |
| JP | 2009225520 A | 10/2009 |
| JP | 2010011697 A | 1/2010 |
| JP | 2010017078 A | 1/2010 |
| JP | 2010022198 A | 1/2010 |
| JP | 2010022199 A | 1/2010 |
| JP | 2010022200 A | 1/2010 |
| JP | 2010022201 A | 1/2010 |
| JP | 2010035403 A | 2/2010 |
| JP | 2010035405 A | 2/2010 |
| JP | 2010057351 A | 3/2010 |
| JP | 2010057352 A | 3/2010 |
| JP | 2010093890 A | 4/2010 |
| JP | 2010093924 A | 4/2010 |
| JP | 2010093939 A | 4/2010 |
| JP | 2010110111 A | 5/2010 |
| JP | 2010110134 A | 5/2010 |
| JP | 2010110137 A | 5/2010 |
| JP | 2010119276 A | 5/2010 |
| JP | 2010119283 A | 5/2010 |
| JP | 2010136588 A | 6/2010 |
| JP | 2010141969 A | 6/2010 |
| JP | 2010142103 A | 6/2010 |
| JP | 2010148300 A | 7/2010 |
| JP | 2010193643 A | 9/2010 |
| JP | 2010193644 A | 9/2010 |
| JP | 2010220329 A | 9/2010 |
| JP | 2010283930 A | 12/2010 |
| JP | 2010288383 A | 12/2010 |
| JP | 2011035962 A | 2/2011 |
| JP | 2011035976 A | 2/2011 |
| JP | 2011057174 A | 3/2011 |
| JP | 2011072053 A | 4/2011 |
| JP | WO2009119456 A1 | 7/2011 |
| JP | 2011193692 A | 9/2011 |
| JP | 2011223778 A | 11/2011 |
| JP | 2011234453 A | 11/2011 |
| JP | 2011244562 A | 12/2011 |
| JP | 2011250659 A | 12/2011 |
| JP | WO2010041448 A1 | 3/2012 |
| JP | 2012147519 A | 8/2012 |
| JP | 2012187000 A | 9/2012 |
| JP | 2012200145 A | 10/2012 |
| JP | 2012200146 A | 10/2012 |
| JP | 2012245867 A | 12/2012 |
| JP | WO2011013629 A1 | 1/2013 |
| WO | 2007036810 A2 | 4/2007 |
| WO | 2007052503 A1 | 5/2007 |
| WO | 2010001899 A1 | 1/2010 |

* cited by examiner

MOTOR WITH SPEED REDUCTION MECHANISM

CROSS REFERENCE TO RELATED APPLICATIONS

This application is a continuation of U.S. patent application Ser. No. 14/638,502, filed on Mar. 4, 2015, published as U.S. Patent Application Publication No. 2015/0180314, which is a continuation of U.S. patent application Ser. No. 13/387,560, filed on Jan. 27, 2012, published as U.S. Patent Application Publication No. 2012/0119601, which is the National Stage filing of PCT Application No. PCT/JP2010/062544 filed on Jul. 26, 2010, which claims priority to Japanese Patent Application No. 2009-178154 filed Jul. 30, 2009, each of which is hereby incorporated by reference in its entirety.

TECHNICAL FIELD

The present invention relates to a motor with speed reduction mechanism.

BACKGROUND ART

In general, in a wiper device to be mounted on a vehicle, a motor with speed reduction mechanism is used as a driving source for periodically swinging a wiper arm. This motor with speed reduction mechanism has a motor unit having brushes and an armature and a speed reduction mechanism unit for reducing the speed of rotation of the armature of the motor unit. The speed reduction mechanism unit is provided with a control device controlling the rotation of the armature, thereby controlling a position and a speed of the wiper arm. Also, the control device is provided with a plurality of field effect transistors (hereinafter simply referred to as "FETs") as switching elements. Electric current to be supplied from a power supply to the motor unit is controlled with an ON/OFF operation of these FETs.

The FETs produce heat due to switching loss occurring at the time of this ON/OFF operation and reach high temperature when the ON/OFF operation is frequently performed. Heat generated from the FETs is transmitted together with heat from the motor unit to a control board. For this reason, on a cover of the speed reduction mechanism unit, a heat sink is provided in the vicinity of the FETs disposed on the control board of the control device, and heat generated from the FETs is dissipated by the heat sink to the outside.

However, for example, when the motor unit continuously operates, large heat is generated from the FETs and coils of the motor unit. This heat is transmitted to the control board, and we are concerned that the temperature of the control board may exceed a specified (durable) temperature. In order to get around this, a temperature detection circuit is provided on the control board, and when it is determined by the temperature detection circuit that the temperature of the control board exceeds a predetermined temperature, the temperature detection circuit is configured to cut off the electric current to be supplied from the power supply via the FETs to the motor unit. With the cutoff of the electric current, the control board is prevented from going out of order (for example, Japanese Patent Application Laid-Open Publication No. 2007-097352).

SUMMARY OF THE INVENTION

As described above, the FETs and the coil of the motor unit are a main heat source of heat to be transmitted to the control board. However, for the purpose of decreasing the size of motors, in a motor for use in a wiper device, a multipolar motor with four or more magnetic poles of a magnet has been suggested in recent years, and the brushes can also be a source of heat to be transmitted to the control board. In this multipolar motor, a distance between a brush on a ground side and a brush on a power supply side disposed in a brush accommodating part is short in some cases. As such, when the brushes on the ground side and the power supply side are close to each other, the temperature of the resin made cover provided near the brushes and integrally mounted on the speed reduction mechanism unit is increased due to heat generated at the brushes. For this reason, a temperature gradient between the cover and the speed reduction mechanism unit including the control board is increased, and the temperature of the control board is increased not only due to heat generated from the FETs and the coil of the motor unit but also due to heat generated from the brushes.

And, with heat from the brushes being further added to the control board, the temperature of the control board is prone to be further increased, and the temperature of the temperature detection circuit is prone to reach a predetermined temperature, thereby posing a problem such that it is difficult to actuate the motor with speed reduction mechanism for a long period of time.

Therefore, an object of the present invention is to provide a motor with speed reduction mechanism capable of efficiently dissipating heat generated from brushes and reducing the heat to be transmitted to the control board from the brushes.

In order to solve the above problem, a motor with speed reduction mechanism according to the present invention, comprises: a yoke having a bottom surface; a magnet formed with at least four poles in which different magnetic poles are alternately disposed on an inner peripheral surface of the yoke; an armature including an armature shaft which has one end rotatably supported by a bottom portion of the yoke, a commutator which is fixed to the armature shaft, and a core which is fixed to the armature shaft and around which a winding wire is wound, wherein the armature is rotatably disposed on an inner side of the magnet; at least two brushes slidably contacting with the commutator; brush holders on which the at least two brushes are mounted; a gear housing formed into a bottomed open shape and formed with a speed reduction mechanism accommodating part having accommodated therein a speed reduction mechanism engaged with a worm formed on the armature shaft, the gear housing being; and a gear housing cover covering the opening of the gear housing, wherein a first heat dissipating member is mounted on the gear housing, and at least said two brushes are disposed in the vicinity of the first heat dissipating member.

With this configuration, heat generated from the brushes can be transmitted to the first heat dissipating member formed in the gear housing and dissipated.

A control board on which a plurality of FETs are mounted is fixed to the gear housing cover, and a second heat dissipating member from which heat generated from the plurality of FETs is dissipated is formed on an outer peripheral surface of the gear housing near the plurality of FETs.

With this configuration, heat generated from the FETs and heat transmitted from the first heat dissipating member can be dissipated from the second heat dissipating member.

A heat conducting member is disposed between the first heat dissipating member and the brushes.

With this configuration, heat generated from the brushes can be dissipated from the first heat dissipating member via the heat conducting member.

A FET heat dissipating member is disposed between the second heat dissipating member and the FETs.

With this configuration, heat generated from the FETs can be dissipated from the second head dissipating member via the FET heat dissipating member.

The first heat dissipating member is formed into an elliptical shape in the gear housing, with paired flat surface parts and paired curved parts alternately disposed, the first heat dissipating member being formed on one flat surface part of the paired flat surface parts.

With this configuration, heat generated from the brushes can be transmitted to the first heat dissipating member disposed on one flat surface part of the paired flat surface parts of the gear housing and dissipated.

A motor with speed reduction mechanism according to the present invention comprises: a yoke with a bottom surface; a magnet having at least four poles, two different magnetic poles being alternatively disposed on an inner peripheral surface of the yoke; an armature having an armature shaft disposed on an inner side of the four pole magnet, the armature shaft having one end rotatably supported by a bottom portion of the yoke, a commutator fixed to the armature shaft and formed of a plurality of segments, and a core fixed to the armature shaft and around which a winding wire is wound, the armature being rotatably disposed on the inner side of the magnet; an armature including a winding wire part wound around the armature core and a plurality of connecting members with which paired segment parts facing each other among the plurality of segment parts are electrically connected to each other; a brush holder unit including at least two brushes in wiping contact with the commutator and disposed so as to be shifted by approximately 90 degrees from each other with respect to a center of rotation of the armature shaft and brush holders holding the brushes; and a gear housing including a speed reduction mechanism accommodating part having accommodated therein a speed reduction mechanism connected to an opening of the yoke and engaged with a worm formed on the armature shaft; and a gear housing cover on which a control board for controlling rotation of the armature is mounted, the gear housing cover covering the opening of the gear housing, a first heat dissipating member being formed in the gear housing, and the at least two brushes being disposed near the first heat dissipating member.

With this configuration, heat generated from the brushes can be transmitted to the first heat dissipating member formed in the gear housing and dissipated.

A plurality of FETs are mounted on the control board, and a second heat dissipating member from which heat generated from the plurality of FETs is dissipated is formed on an outer peripheral surface of the gear housing near the plurality of FETs.

With this configuration, heat generated from the FETs and heat transmitted from the first heat dissipating member can be dissipated from the second heat dissipating member.

A heat conducting member is disposed between the first heat dissipating member and the brushes.

With this configuration, heat generated from the brushes can be dissipated from the first heat dissipating member via the heat conducting member.

A FET heat dissipating member is disposed between the second heat dissipating member and the FETs.

With this configuration, heat generated from the FETs can be dissipated from the second heat dissipating member via the FET heat dissipating member.

The first heat dissipating member is formed into an elliptical shape in the gear housing, with paired flat surface parts and paired curved parts alternately disposed, the first heat dissipating member being formed on one flat surface part of the paired flat surface parts.

With this configuration, heat generated from the brushes can be transmitted to the first heat dissipating member disposed on one flat surface part of the paired flat surface parts of the gear housing and dissipated.

A motor with speed reduction mechanism according to the present invention comprises: a yoke with a bottom surface; a magnet formed of at least four poles so that different magnetic poles are alternately disposed on an inner peripheral surface of the yoke; an armature having an armature shaft having one end rotatably supported by a bottom portion of the yoke, a commutator fixed to the armature shaft and formed of a plurality of segments, and a core fixed to the armature shaft and around which a winding wire is wound, the armature being rotatably disposed on the inner side of the magnet; at least two brushes slidably contacting with the commutator; brush holders on which the at least two brushes are mounted; a gear housing having a speed reduction mechanism accommodating part having accommodated therein a speed reduction mechanism engaged with a worm formed on the armature shaft, the gear housing formed into a shape with a bottom surface and an opening; and a gear housing cover covering the opening of the gear housing, two electrical conducting members formed so as to protrude toward the gear housing and electrically connected to the brushes being fixed to the gear housing cover, a brush terminal connecting part to which the two electrical conducting members are each electrically connected being formed in the brush holders, and a first heat dissipating member being formed in the gear housing so as to be separated from the brush terminal connecting part.

With this configuration, heat generated from the brushes can be transmitted to the first heat dissipating member formed in the gear housing and dissipated.

A control board on which a plurality of FETs are mounted is fixed to the gear housing cover, and a second heat dissipating member from which heat generated from the plurality of FETs is dissipated is formed on an outer peripheral surface of the gear housing near the plurality of FETs.

With this configuration, heat generated from the FETs and heat transmitted from the first heat dissipating member can be dissipated from the second heat dissipating member.

A heat conducting member is disposed between the first heat dissipating member and the brushes.

With this configuration, heat generated from the brushes can be dissipated from the first heat dissipating member via the heat conducting member.

A FET heat dissipating member is disposed between the second heat dissipating member and the FETs.

With this configuration, heat generated from the FETs can be dissipated from the second heat dissipating member via the FET heat dissipating member.

The first heat dissipating member is formed into an elliptical shape in the gear housing, with paired flat surface parts and paired curved parts alternately disposed, the first heat dissipating member being formed on one flat surface part of the paired flat surface parts.

With this configuration, heat generated from the brushes can be transmitted to the first heat dissipating member disposed on one flat surface part of the paired flat surface parts of the gear housing and dissipated.

According to the present invention, heat generated from the brushes can be dissipated from the first heat dissipating member disposed on the gear housing. Therefore, heat is less prone to be transmitted to the control board, and the temperature of the temperature detection circuit is less prone to reach a predetermined temperature, thereby allowing the wiper motor to be actuated for a long time.

BRIEF DESCRIPTION OF THE DRAWINGS

FIG. 4B is a view of a state in which;

BEST MODE FOR CARRYING OUT THE INVENTION

Figure 1:
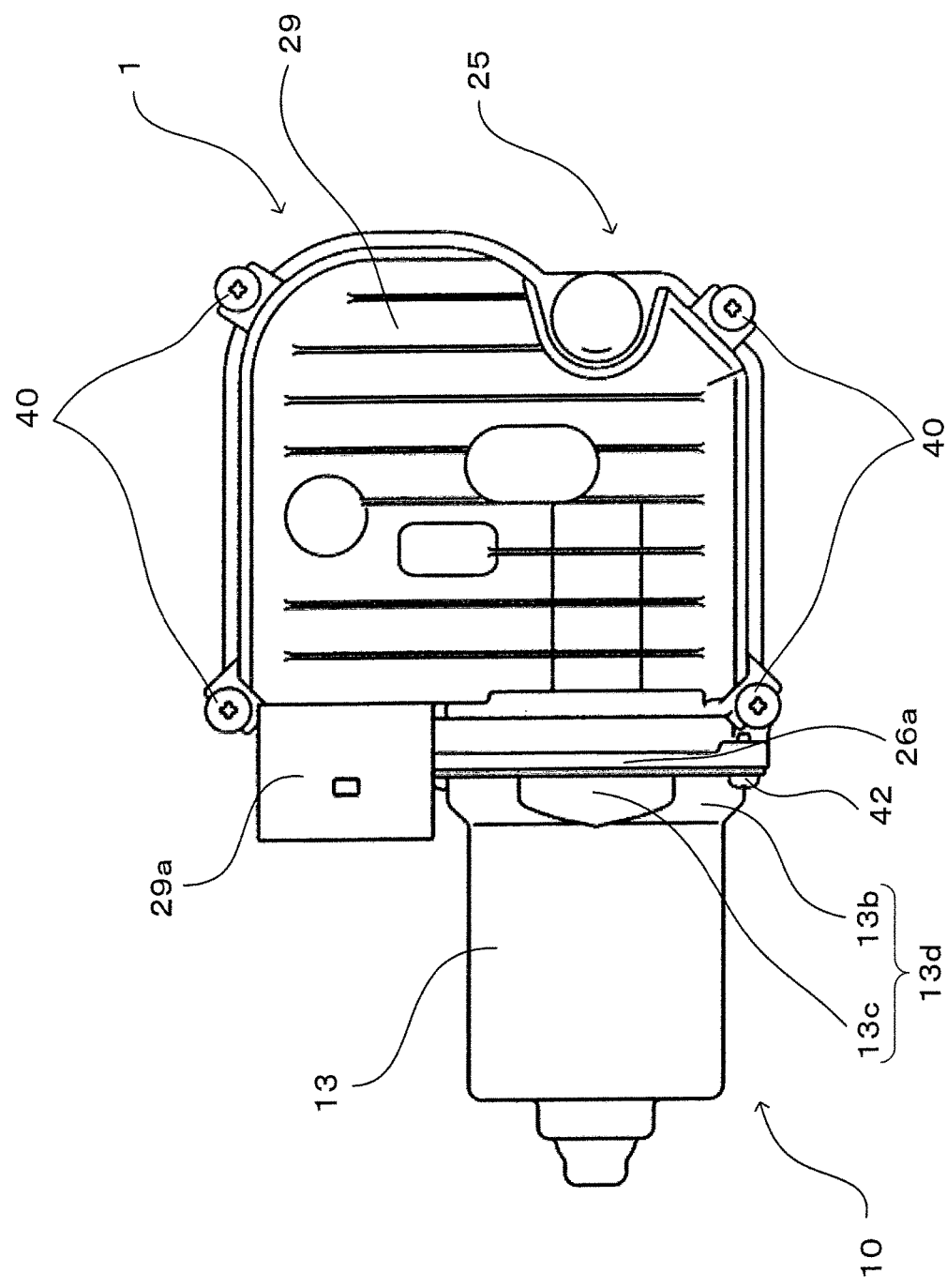
FIG. 1 is a view of a motor with speed reduction mechanism according to one embodiment of the present invention seen from a gear housing cover side.
Figure 2A:
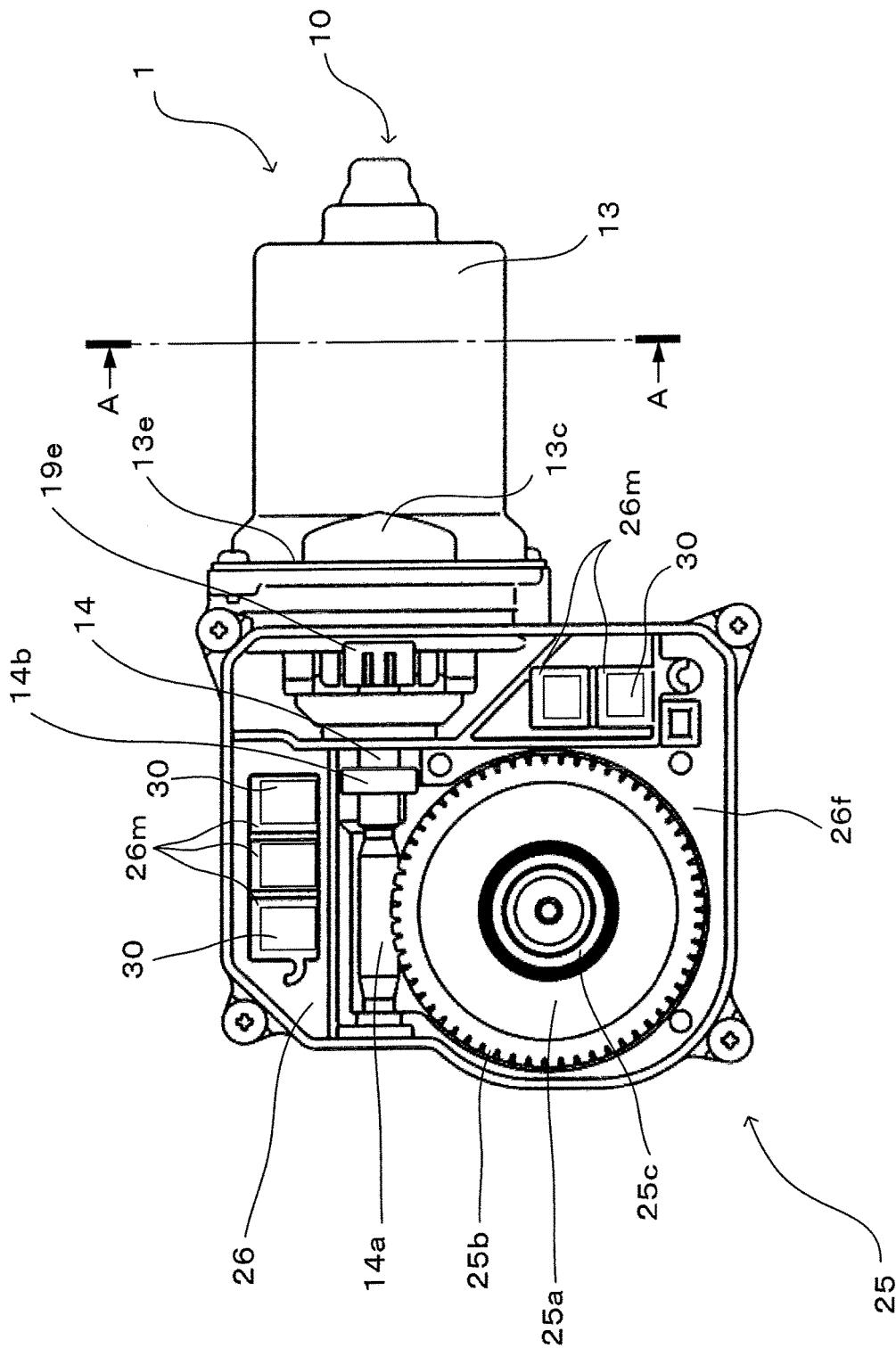
FIG. 2A is a view of a state in which a gear housing cover is removed from it shown in FIG. 1.

A wiper motor 1 as a motor with speed reduction mechanism according to the present invention includes, as shown in FIGS. 1 and 2A, a motor unit 10 for performing a rotating operation with electric current and a speed reduction mechanism unit 25 for reducing the speed of rotation of the motor unit 10 and transmitting the speed reduced rotation to an output shaft 24.

Figure 2B:
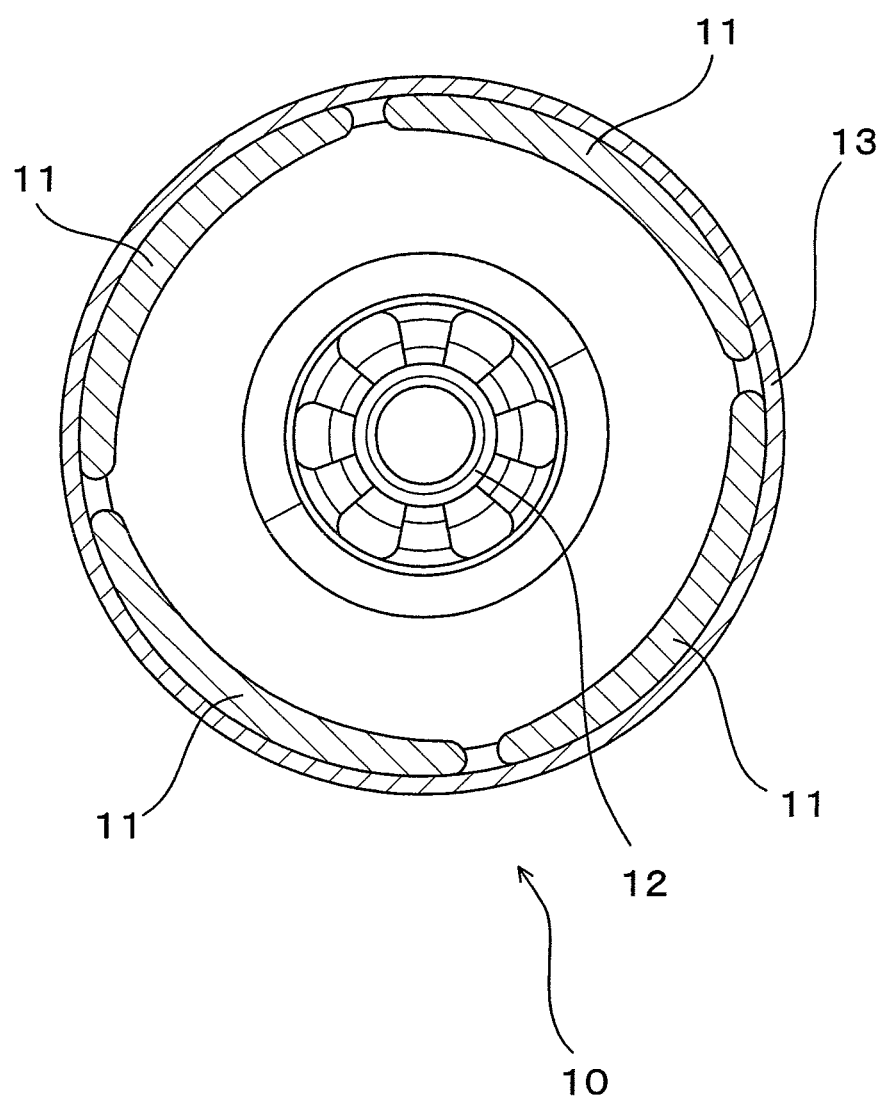
FIG. 2B is a view of a state in which an armature is removed from a yoke in a sectional view of the yoke along a line A-A in FIG. 2A.

As shown in FIGS. 1, 2A, and 2B, the motor unit 10 includes a yoke 13 which is formed into a bottomed cylindrical shape, at least four magnets 11 are fixed to an inner circumferential surface thereof, a gear housing 26 is fixed to one end surface thereof, and a shaft bearing part 12 is fixed to the other end surface thereof.

Figure 3A:
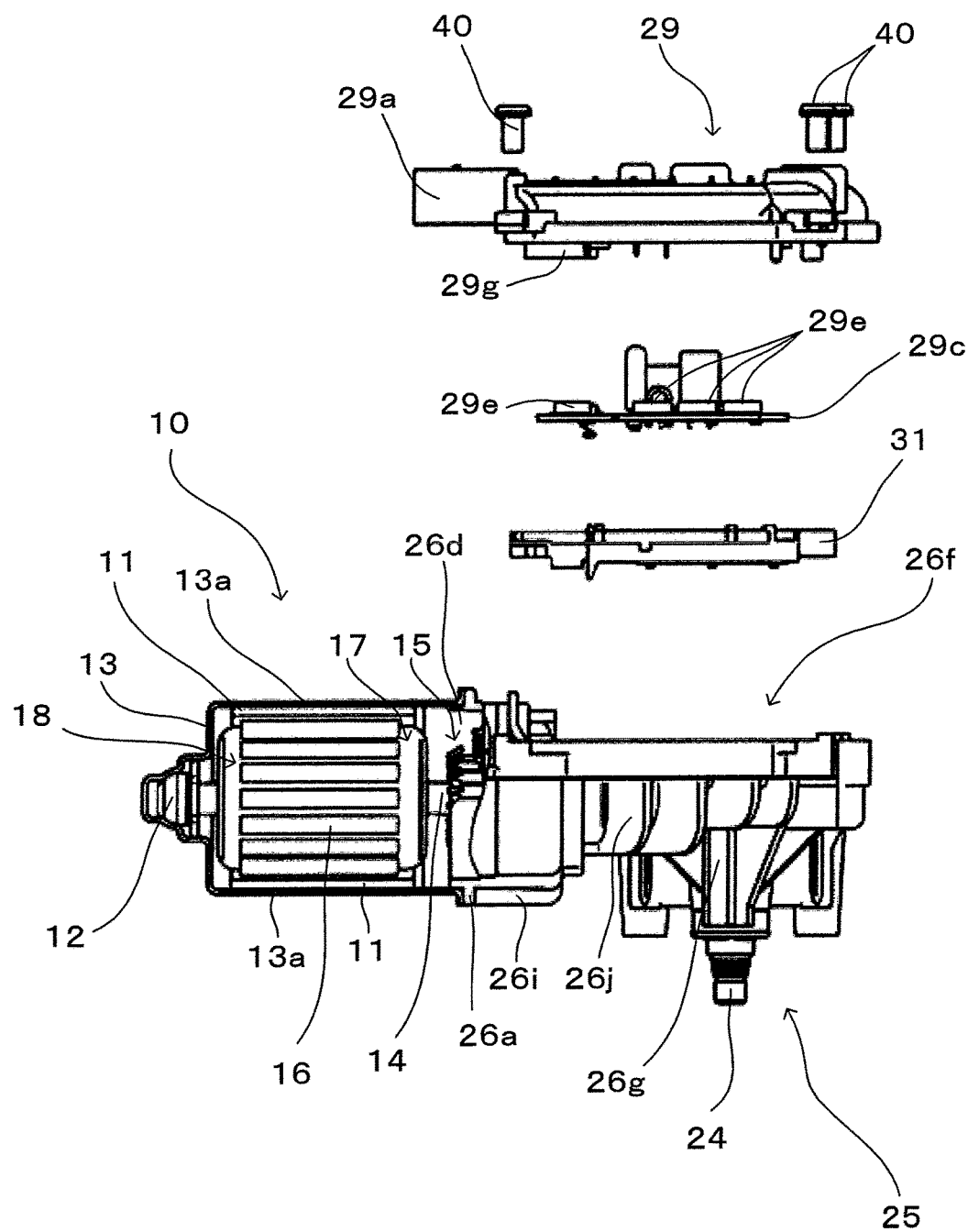
FIG. 3A is a fragmentary sectional and development view of the motor with speed reduction mechanism shown in FIG. 1.
Figure 5A:
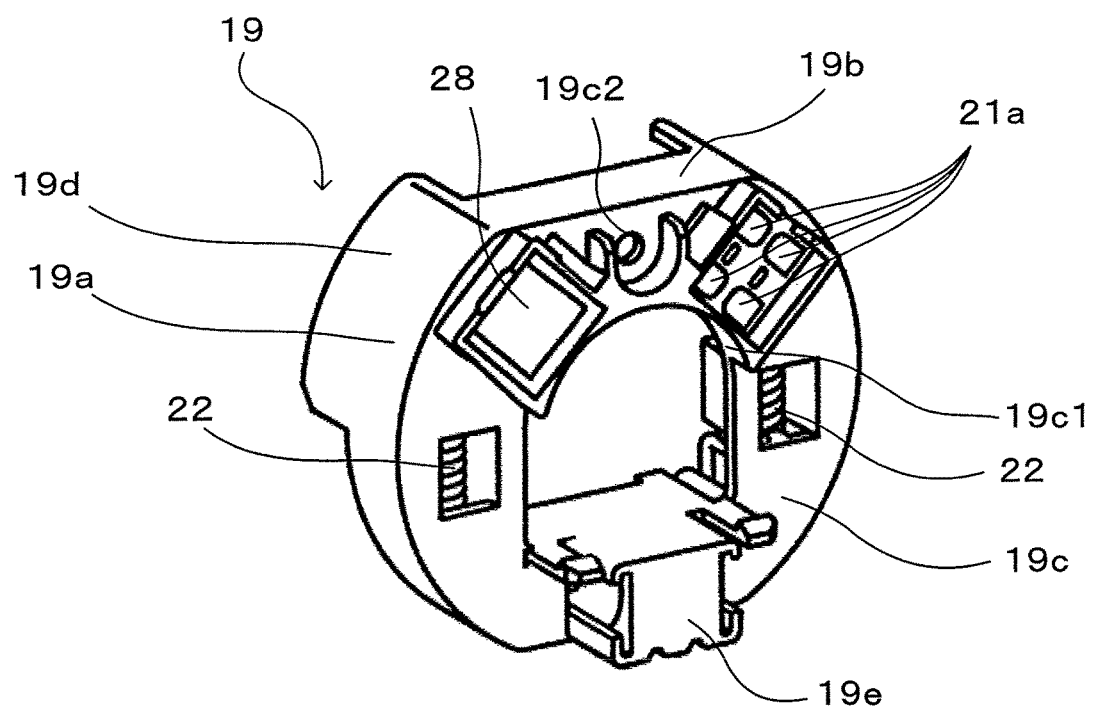
FIG. 5A is a perspective view of a brush holder part seen from a brush terminal connecting part side.
Figure 5B:
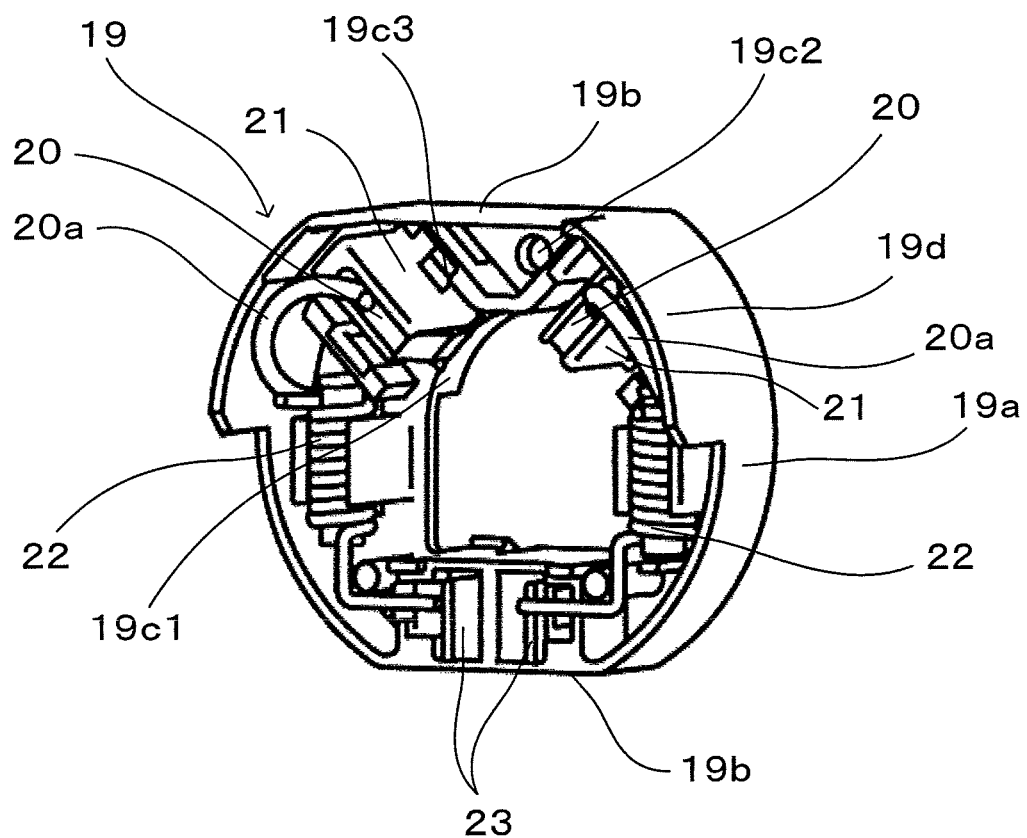
FIG. 5B is a perspective view of the brush holder part seen from a brush holder side.

Furthermore, as shown in FIGS. 2A and 3A, the motor unit 10 includes an armature shaft 14 having one end rotatably supported by the bearing part 12 and having a worm part 14a formed at its tip, a commutator 15 fixed to the armature shaft 14, an armature core 16 adjacent to the commutator 15 and fixed to the armature shaft 14, and a winging wire part 17 wound around the armature core 16, wherein an armature 18 is rotatably disposed on the inner side of the plurality of magnets 11. Furthermore, as shown in FIGS. 5A and 5B, the motor unit 10 has a brush holder unit 19 including a plurality of brushes 20 and 20 slidably supporting the commutator 15 with the rotation of the armature 18, and brush holders 21 and 21 holding the respective brushes 20 and 20.

The speed reduction mechanism unit 25 includes a worm wheel part 25a for reducing the speed of rotation of the motor unit 10, and the gear housing 26 having a bottomed speed reduction mechanism accommodating part 26f in which the worm wheel part 25a is accommodated. Furthermore, the speed reduction mechanism unit 25 further includes a gear housing cover 29 covering an opening of the speed reduction mechanism accommodating part 26f, and a brush holder accommodating part 26d in which the brush holder unit 19 is accommodated. The worm wheel part 25a includes the output shaft 24 for reducing the speed of rotation of the armature 18 of the motor unit 10 and transmitting the speed reduced rotation, and the brush holder accommodating part 26d is cylindrically formed and is integrally molded with the gear housing 26. The gear housing 26 and the gear housing cover 29 are fixed to each other by a plurality of screws 40.

The worm wheel part 25a included in the speed reduction mechanism unit 25 is made of resin such as polyacetal, into a disk shape, and has an outer peripheral surface formed with an engaging part 25b engaged with the worm part 14a of the armature shaft 14. The output shaft 24 is integrally mounted at the center of rotation of the worm wheel part 25a. With this, when the armature 18 rotates, with the rotation of the worm part 14a, the worm wheel part 25a engaged with the worm part 14a rotates with the reduced speed of rotation, thereby reducing the speed of rotation of the armature 18 and transmitting the reduced speed of rotation to the output shaft 24.

In the vicinity of the output shaft 24 of a base end of the worm wheel part 25a, an annular magnet 25c is mounted so that its rotation center coincides with the rotation center of the output shaft 24. Furthermore, the annular magnet 25c is polarized so as to have an N pole in a range of 90 degrees in a circumferential direction and an S pole in the other range of 270 degrees in the circumferential direction. In the vicinity of the annular magnet 25c, two Hall ICs for absolute position detection 29d and 29d are provided on a control board 29c which will be further described below. The Hall ICs for absolute position detection 29d and 29d are configured to detect switching of a magnetic pole occurring from the annular magnet 25c with the rotation of the output shaft 24. And, based on a signal generated by the two Hall ICs for absolute position detection 29d and 29d and corresponding to the switching of the magnetic pole occurring from the annular magnet 25c, a moving direction and a moving position of a wiper device mounted at the tip of the output shaft 24 of the motor with speed reduction mechanism are detected.

Then, a heat dissipating structure of the gear housing 26 will be described as features of the present invention on the basis of FIGS. 2A, 3A, 6 and 7.

The yoke 13 is integrally molded by press working from a plate material into a bottomed cylindrical shape, and a magnet fixing part 13a in which the plurality of magnets 11 are fixed onto its inner peripheral surface and a yoke connecting part 13d integrally connected to the magnet fixing part 13a are formed in the yoke 13. And in the yoke connecting part 13d, paired curved parts 13b and paired flat surface parts 13c alternately connected so as to be formed into an elliptical shape seen from an axial direction. On the end face of the yoke 13, a flange shaped fixing part 13e is formed, and the gear housing 26, which will be described further below, is fixed to the flange shaped fixing part 13e. The yoke connecting part 13d is formed so that an arc diameter is gradually widened from the magnet fixing part 13a toward the yoke end face. On the inner peripheral surface of the magnet fixing part 13a, four magnets 11 are fixed with an adhesive or the like so that two N poles and two S poles, which are different magnetic poles, are alternately disposed, that is, the same poles face each other.

The armature shaft 14 has one end rotatably supported by the bearing part 12 of the yoke 13, and the armature shaft 14 is disposed on the inner side of the four magnets 11. The armature shaft 14 has the other end formed with the worm part 14a formed into a spiral shape by component rolling. To the armature shaft 14, a cylindrical shaped ring magnet 14b is fixed. On the ring magnet 14b, N poles and S poles are alternately arranged 30 degrees apart from each other, that is, twelve magnetic poles are formed as being polarized. On the control board 29c, which will be described further below, two Hall ICs for rotating direction detection 29b and 29b are provided at positions facing the ring magnet 14b. The Hall ICs for rotating direction detection 29b and 29b detect switching of a magnetic pole occurring from the ring magnet 14b according to the rotation of the armature 18, and each of the Hall ICs 29b and 29b generates a rotation signal with its phase shifted by 90 degrees from another. The rotating direction of the armature 18 is detected based on the rotating signals with their phases shifted by 90 degrees from each other.

Figure 4A:
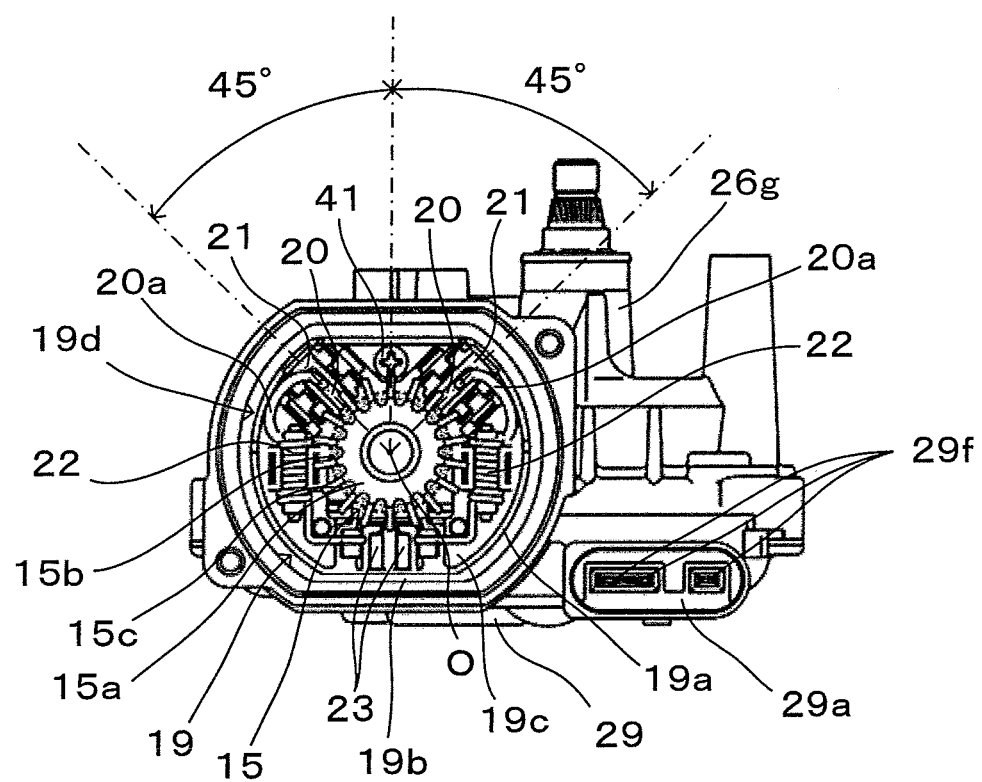
FIG. 4A is a view of a state in which a motor unit is removed from the motor with speed reduction mechanism.

As shown in FIG. 3A and FIG. 4A, the commutator 15 includes an insulating cylindrical part 15a formed into a cylindrical shape and made of insulating material such as thermosetting resin, and a plurality of segment parts 15b spaced at predetermined intervals in a circumferential direction on an outer peripheral surface of the insulating cylindrical part 15a and made of electrical conducting material such as copper. The commutator 15 is fixed to the armature shaft 14 so that the inner peripheral surface of the insulating cylindrical part 15a is engaged with the outer peripheral surface of the armature shaft 14. At one end on the outer peripheral surface of each segment part 15b, a coil connecting part 15c is formed, and each coil connecting part 15c is connected to a coil 17a.

The armature core 16 is formed into a cylindrical shape by stacking in layers predetermined numbers of core substrates which are stamped out by press working, and the armature core 16 includes a shaft fixing part to which the armature shaft 14 is fixed, and eighteen teeth parts radially extending from the shaft fixing part.

Figure 3B:
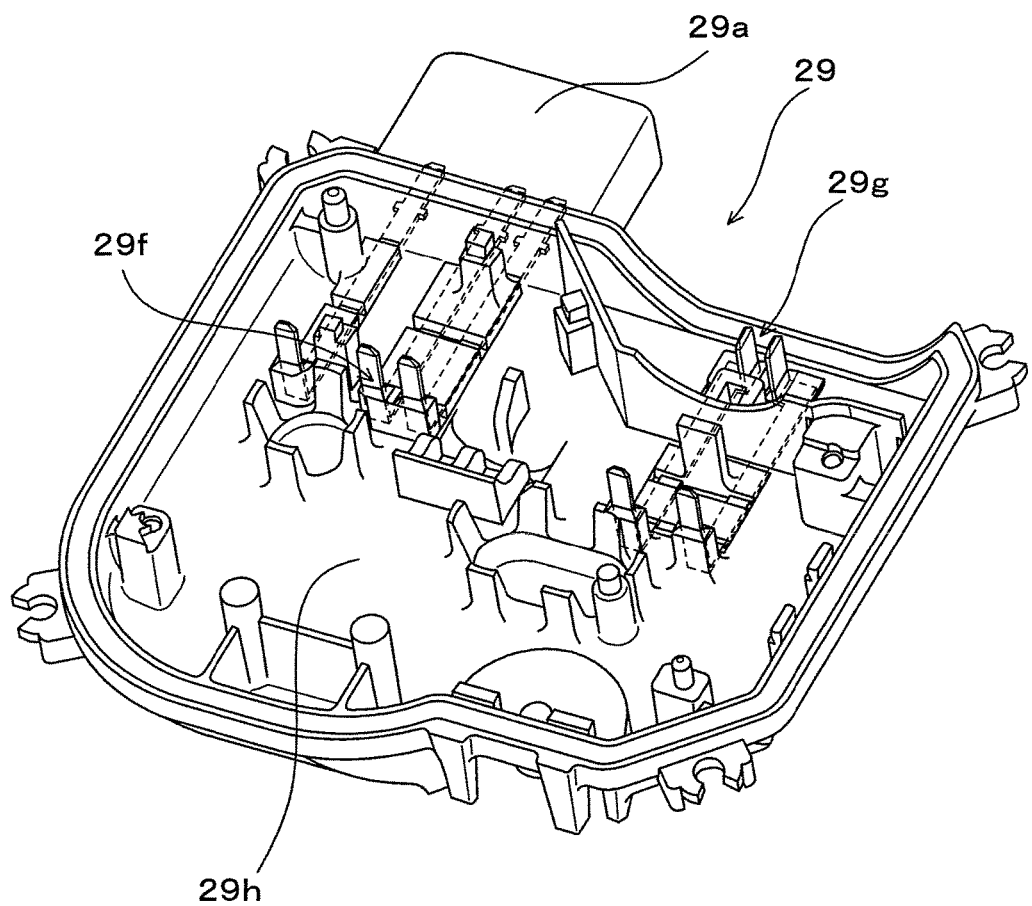
FIG. 3B is a perspective view of a gear housing cover.
Figure 3C:
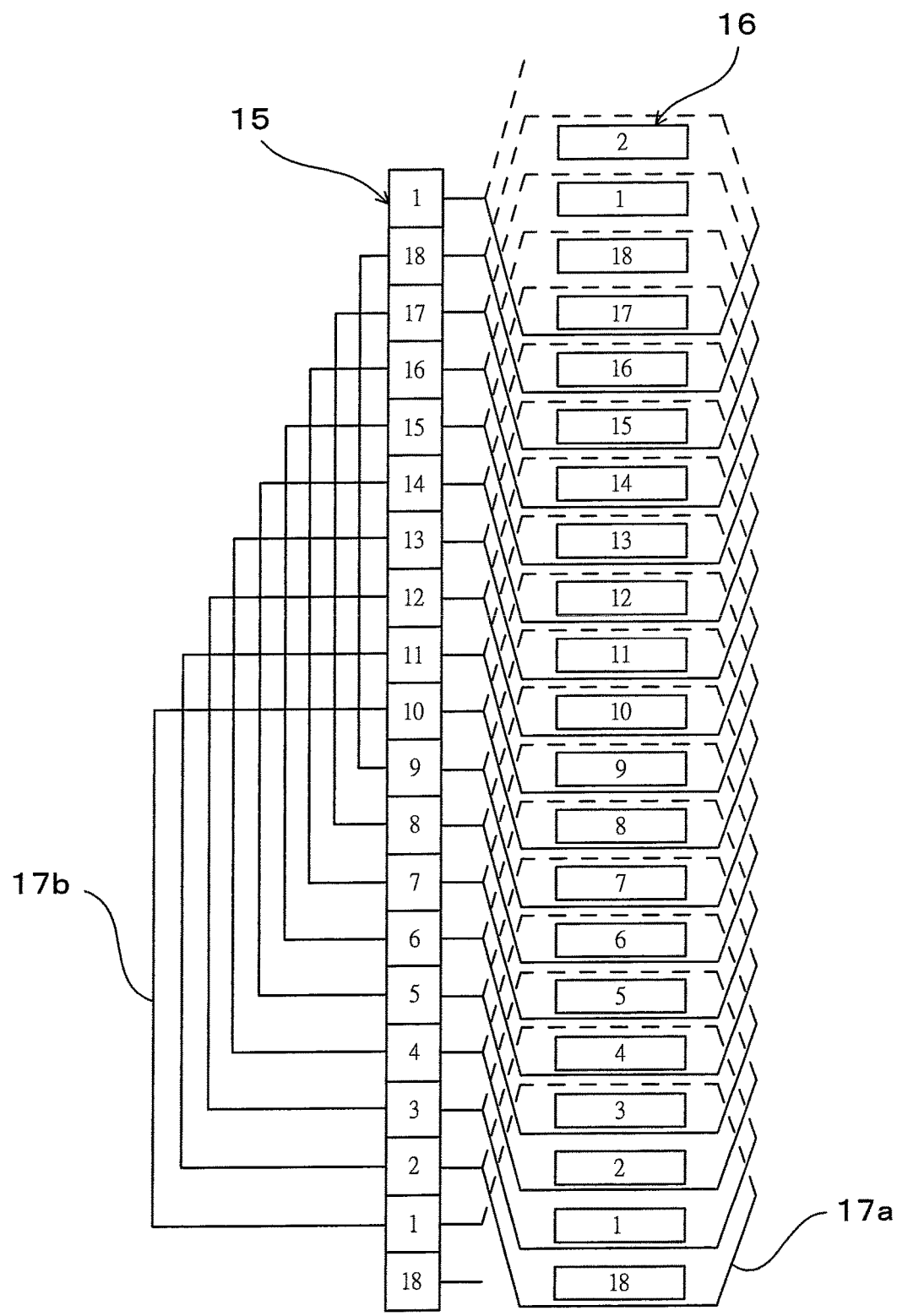
FIG. 3C is a development view of windings of an armature.

As shown in FIGS. 3A and 3C, a coil 17a made of copper wire is wound around the armature core 16. One end of the coil 17a is fixed to the coil connecting part 15c of one of the segment parts 15b, and the coil 17a is wound by lap winding between predetermined teeth parts a plurality of times. Furthermore, after the coil 17a is wound by lap winding between the predetermined teeth parts the plurality of times, the other end of the coil 17a is fixed to the coil connecting part 15c of another segment part 15b. Then, a connecting line (electric current supply line) 17b is connected to one segment part 15b facing another segment part 15b. In this manner, the coil 17a is wound around the armature core 16 by repeating a process of winding the coil 17a about each teeth part. With this, when electric power is supplied to the brushes 20 and 20, electric current flows through the coil 17a, and the armature 18 is rotated, thereby driving the wiper motor 1.

When the four pole magnet is used, four brushes are normally required. However, in this invention, by connecting facing segments to each other through the connecting line (electric current supply line) 17b, the electric current flowing through a segment part from one brush 20 flows also through a facing segment part via the connecting line 17b. With this, the number of brushes can be decreased from four to two.

As shown in FIGS. 5A and 5B, the brush holder unit 19 includes a base part 19c in which paired curved parts 19a and paired flat surface parts 19b are alternately connected so as to be formed into an elliptical shape.

The base part 19c is formed with an opening portion 19c1 through which the armature shaft 14 is penetrated, and a fixing opening portion 19c2 through which a screw 41 is penetrated, thereby fixing the brush holder unit 19 and the gear housing 26. And the brush holders 21 and 21 made of metal material such as brass are fixed to the base part 19c, and two brushes 20 and 20 are disposed in the brush holders 21 and 21 so as to be able to get close to and away from the commutator 15. As shown in FIGS. 4A and 5B, in this invention, two brushes 20 and 20 are located around the rotation center O of the armature 18 at intervals of approximately 90 degrees.

The brush holders 21 are disposed in the vicinity of one of the paired flat surface parts 19b of the base part 19c. Fixing claws 21a of the brush holders 21 are inserted in a brush holder fixing portion 19c3 formed in the base part 19c, and the fixing claws 21a are folded on the back surface side of the base part 19c, so that the brush holder 21 is fixed to the base part 19c.

Furthermore, the brush holder unit 19 includes a brush holder guide wall 19d and a brush terminal connecting part 19e, and the brush holder guide wall 19d is formed into a shape approximately the same as the outer shape (elliptical shape) of the base part 19c and disposed so as to extend at the right angle from the base part 19c. And the brush terminal connecting part 19e protrudes from the base part 19c in a direction opposite to the brush holder guide wall 19d and at the right angle with respect to the base part 19c. Furthermore, the brush terminal connecting part 19e is disposed at a position facing the brushes 20, that is, on the other flat surface part 19b away from the one flat surface part 19b where the brushes 20 and 20 are disposed. With this, it is hard to transmit heat generated from the brushes 20 to the brush terminal connecting part 19e and the control board 29c electrically connected to the brush terminal connecting part 19e.

On the base part 19c, choke coils 22, 22 as noise preventive elements are mounted, and one end of each of the choke coils 22, 22, and a corresponding one of the brushes 20 and 20 are electrically connected via a corresponding one of pigtails 20a, 20a. To the other end of each choke coil 22, a female type brush terminal 23 is electrically connected, and the female type brush terminal 23 is electrically connected to a male type terminal 29g provided to the gear housing cover 29. The female type brush terminal 23 has a tip thereof accommodated in the brush terminal connecting part 19e, and is exposed from the brush terminal connecting part 19e so as to be able to electrically connect to the male type terminal 29g of the gear housing cover 29. When the brush holder unit 19 is mounted on the brush holder accommodating part 26d, the brush holder guide wall 19d abuts on an inner wall 26d1 of the brush holder accommodating part 26d, and the brush holder unit 19 is guided to a bottom portion 26d2 of the brush holder accommodating part 26d. Then, the brush holder unit 19 and the gear housing 26 are fixed with the screw 41 penetrating through the fixing opening portion 19c2 formed in the base part 19c.

Figure 4B:
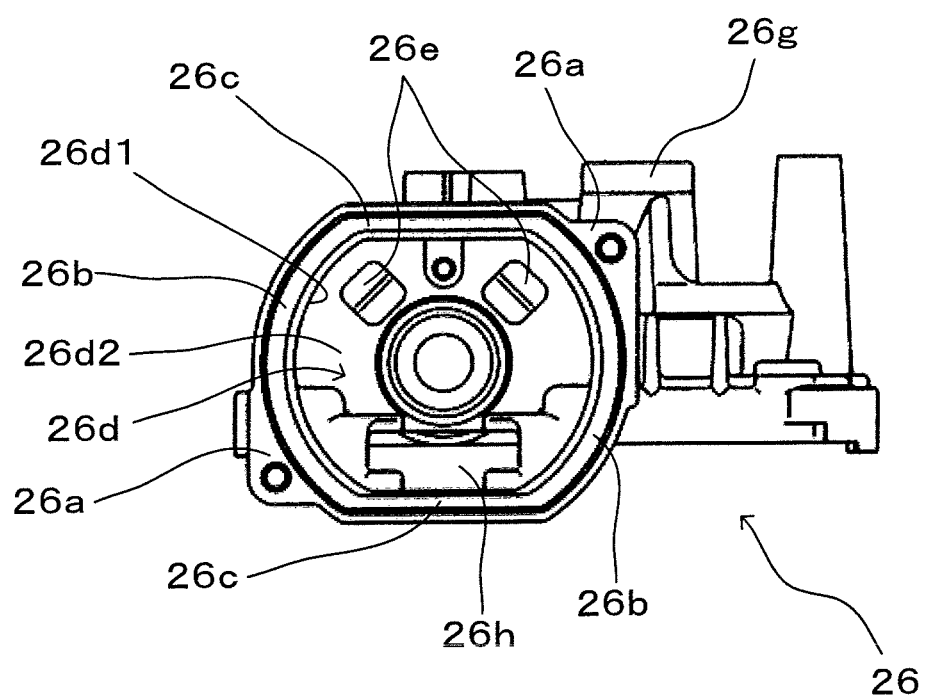

As shown in FIGS. 2A, 3A, and 4B, the gear housing 26 is formed by die cast molding by using metal material such as aluminum. And the gear housing 26 is formed with a yoke fixing part 26a, and the yoke fixing part 26a and the flange shaped fixing part 13e of the yoke 13 abut on each other, and the yoke 13 is mounted on the gear housing 26 with a plurality of screws 42.

The yoke fixing part 26a is formed into an elliptical shape with paired curved parts 26b and paired flat surface parts 26c being alternately connected so as to match the shape of the flange shaped fixing part 13e. In the gear housing 26, the brush holder accommodating part 26d is integrally formed with the yoke fixing part 26a, and the brush holder unit 19 is accommodated in the brush holder accommodating part 26d. On the bottom portion 26d2 of the brush holder accommodating part 26d, brush holder abutting parts 26e each abutting on the fixing claw 21a of the brush holder 21 are formed so as to protrude from the bottom portion 26d2. Heat generated from the brushes 20 and 20 is transmitted from the fixing claws 21a of the brush holders 21 via the brush holder abutting parts 26e to the gear housing 26, and is dissipated from the gear housing 26 to the outside.

Furthermore, in the gear housing 26, a speed reduction mechanism accommodating part 26f in which the worm wheel part 25a is accommodated is formed so as to be adjacent to the brush holder accommodating part 26d. In the gear housing 26, an output shaft supporting part 26g for supporting the output shaft 24 is formed in a direction opposite to an opening of the speed reduction mechanism accommodating part 26f.

Furthermore, in the speed reduction mechanism accommodating part 26f, a cover connecting part 26h opens. After the brush holder unit 19 described above is accommodated in the brush holder accommodating part 26d, two male type terminals 29g which are provided so as to protrude from the bottom surface of the gear housing cover 29 toward the speed reduction mechanism accommodating part 26f penetrate through the cover connecting part 26h to be electrically connected to the female type brush terminals 23 of the brush holder unit 19 disposed in the speed reduction mechanism accommodating part 26f.

The output shaft 24 protruding from the output shaft supporting part 26g is fixed by an output shaft fixing part (a teeth washer) 27, and at the tip of the output shaft 24, a wiper device fixing part 24a is formed, thereby mechanically connecting components forming the wiper device (not shown).

Figure 6:
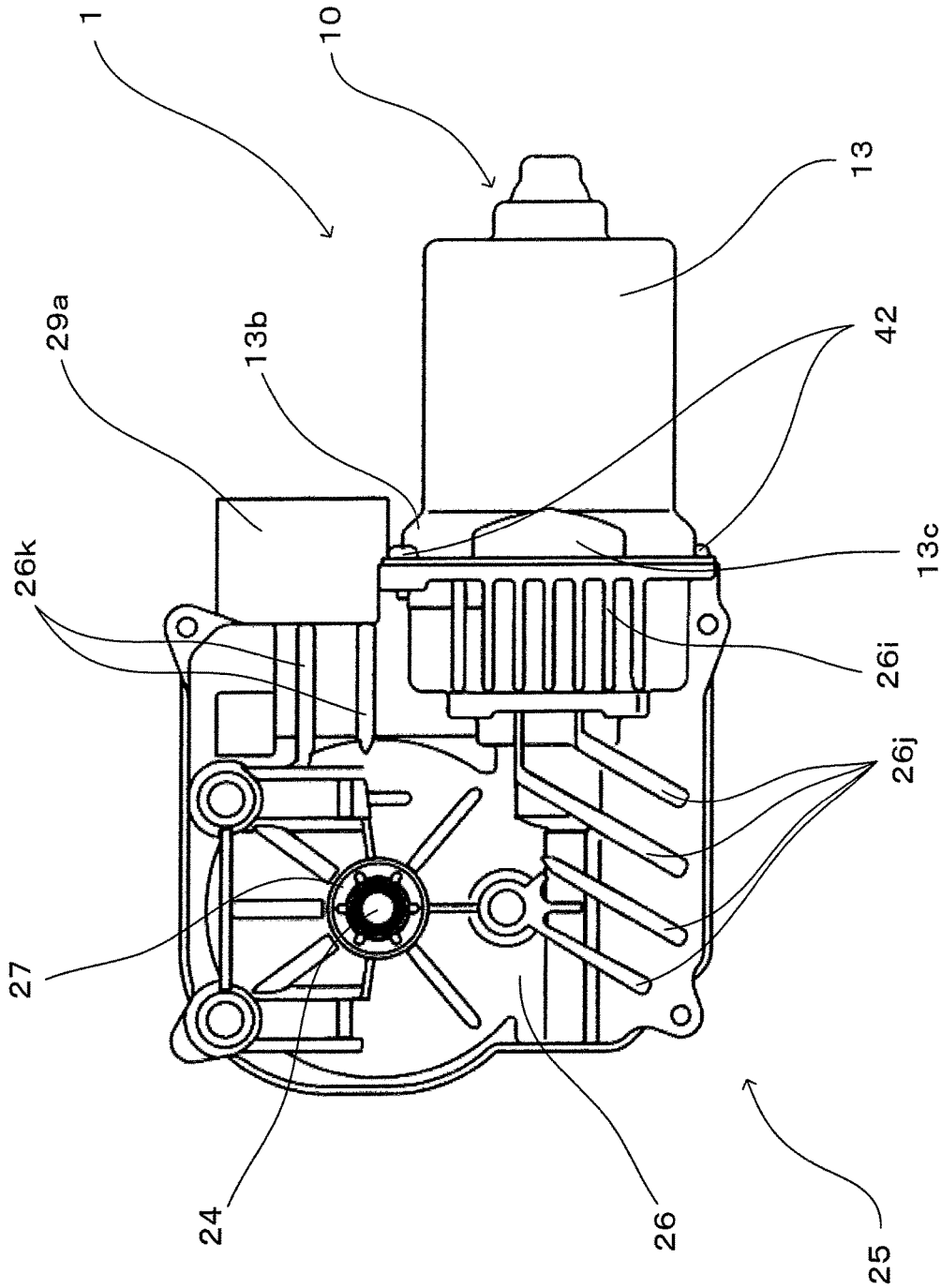
FIG. 6 is a view of the motor with speed reduction mechanism according to the embodiment of the present invention seen from an output shaft side.
Figure 7:
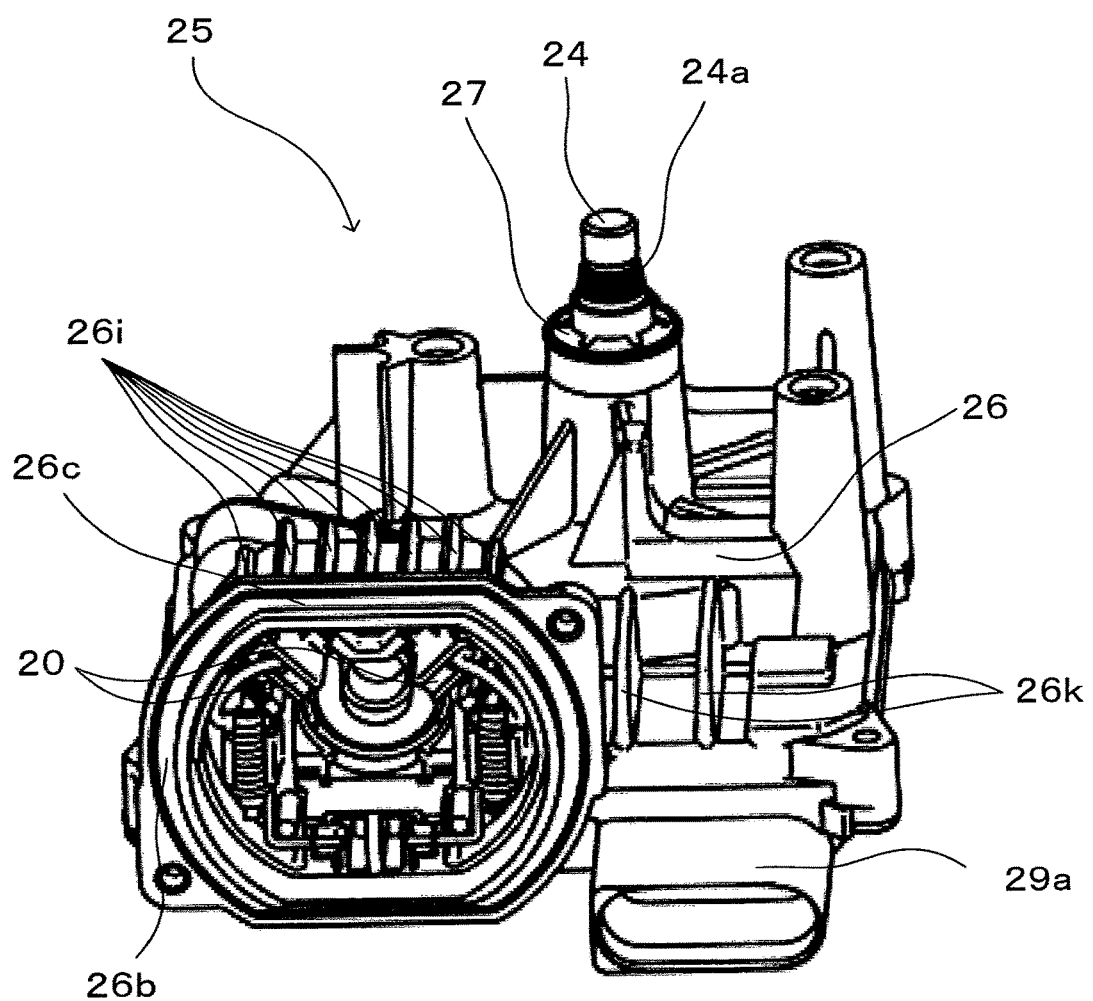
FIG. 7 is a perspective view of a state in which a motor unit is removed from the motor with speed reduction mechanism according to the embodiment of the present invention.

As shown in FIGS. 6 and 7, first heat sinks 26i as first heat dissipating members for dissipating Joule heat generated by electrical factor, that is, contact resistance between the brushes 20 and 20 and the commutator 15, and frictional heat generated by mechanical factor, that is, sliding movement between the brushes 20 and 20 and the commutator 15, a second heat sink 26j as a second heat dissipating member for dissipating heat generated from FETs 29e mounted on the control board, which will be further described below, and a third heat sink 26k as a third heat dissipating member are formed on an outer peripheral surface of the gear housing 26 positioned at a back surface of the speed reduction mechanism accommodating part 26f.

The brushes 20 and 20 are disposed in the vicinity of an outer peripheral surface of one of the paired flat surface parts 26c of the brush holder accommodating part 26d, and the first heat sinks 26i protrude from this surface, and are spaced from each other at predetermined intervals in parallel. The first heat sinks 26i are formed so as to be parallel to a longitudinal direction of the armature shaft 14.

As shown in FIG. 7, in this invention, since two brushes 20 and 20 which are disposed so as to be spaced apart from each other at intervals of approximately 90 degrees are disposed in the vicinity of the first heat sinks 26i, heat generated from the brushes 20 and 20 is transmitted to the first heat sinks 26i and dissipated to the outside. And, since the brushes 20 and 20 are disposed at a position away from the control board 29c with respect to the first heat sinks 26i, it is easy to transmit heat generated from the brushes to the first heat sinks 26i, and it is hard to transmit it to the control board 29c.

Furthermore, as shown in FIG. 5A, between the base part 19c and the brush holder abutting part 26e of the gear housing 26, a gel type heat conducting member 28 is disposed. Heat generated from the brushes 20 and 20 is easily transmitted via the heat conducting member 28 to the first heat sinks 26i.

To an opening of the gear housing 26, the gear housing cover 29 formed into a bottomed shape and formed of insulating material is provided. An open end face of the gear housing 26 and the gear housing cover 29 abut on each other, and the gear housing cover 29 is fixed to the gear housing 26 with the plurality of screws 40.

As shown in FIGS. 3A, 3B, and 4A, the gear housing cover 29 includes a coupler part 29a, and the coupler part 29a is provided with a plurality of terminals 29f. One end of each of the plurality of terminals 29f is electrically connected to a connector part (not shown) provided to a vehicle, and the other end of each of the plurality of terminals 29f is electrically connected to the control board 29c. And the terminals 29f have intermediate portions thereof which are buried in the gear housing cover 29.

Furthermore, from a bottom portion 29h of the gear housing cover 29, two male type terminals 29g protrude, and are electrically connected to the female type brush terminals 23 disposed in the brush holder unit 19. With this configuration, electric power supplied from a power supply of the vehicle is supplied to the motor unit 10 through the plurality of terminals 29f, the control board 29c, the male type terminals 29g, the female type brush terminals 23, the pigtails 20a, and the brushes 20 and 20.

Figure 8:
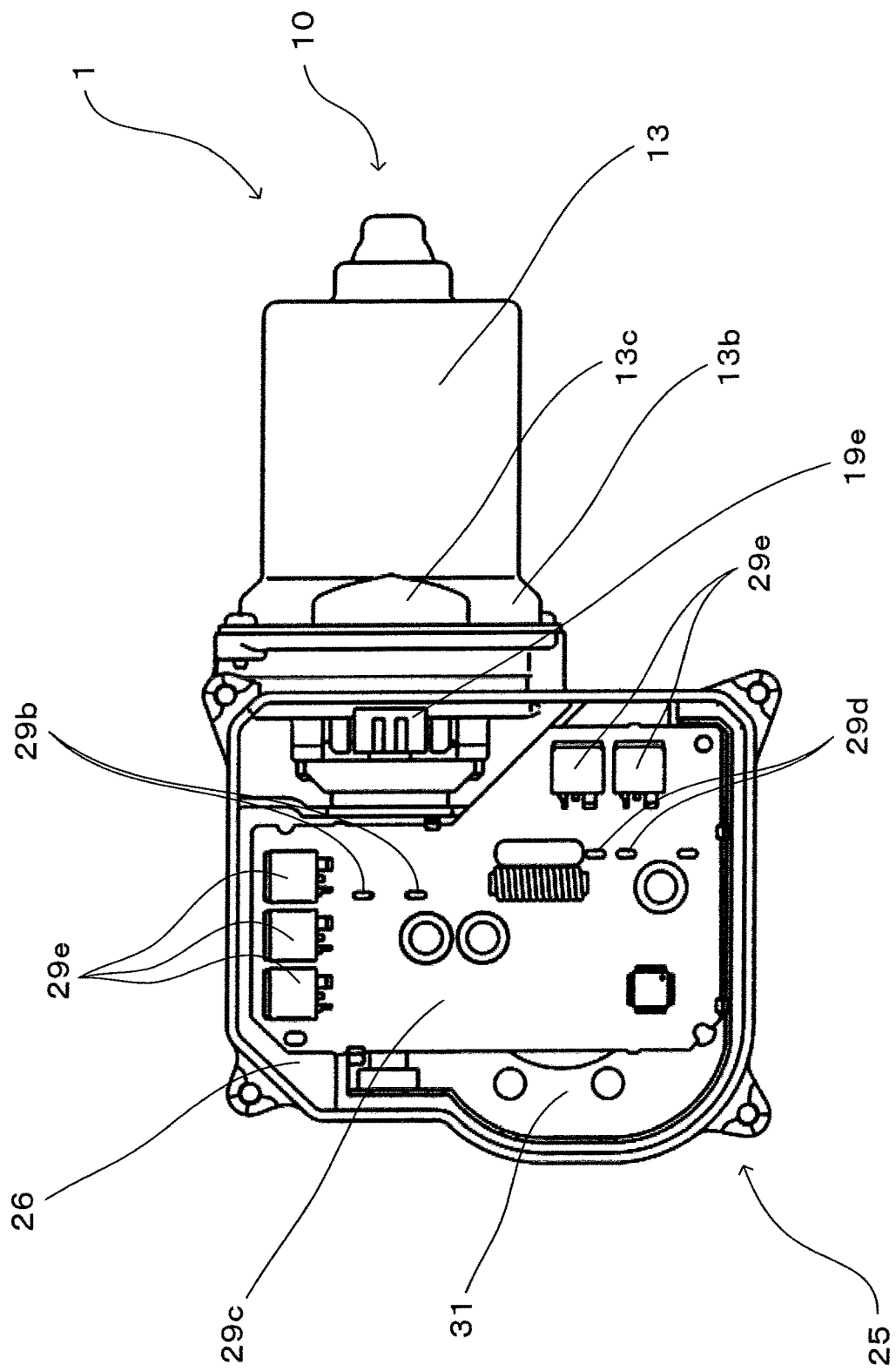
FIG. 8 is a view of a state in which a control board is mounted on it shown in FIG. 2A.

As shown in FIG. 8, the control board 29c is mounted on the bottom portion 29h of the gear housing cover 29 with a plurality of screws, and is accommodated in the speed reduction mechanism accommodating part 26f of the gear housing 26.

On a surface of the control board 29c facing the bottom portion 29h of the gear housing cover, the Hall ICs for rotation detection 29b and 29b and the Hall ICs for absolute position detection 29d and 29d are provided. The Hall ICs for rotation detection 29b and 29b are disposed in the vicinity of the ring magnet 14b provided to the armature shaft 14 of the armature 18 and configured to detect the rotating state of the armature 18. And the Hall ICs for absolute position detection 29d and 29d are disposed in the vicinity of the annular magnet 25c provided to the worm wheel part 25a and configured to detect the rotating state of the output shaft 24 of the wiper motor 1 integrally mounted on the worm wheel part 25a.

And, based on the rotating state of the armature 18 of the motor unit 10 and the rotating state of the output shaft 24 of the wiper motor 1, the control board 29c is configured to control the rotation of the armature 18 of the motor unit 10.

The control board 29c is provided with the plurality of FETs 29e to control electric current flowing through the motor unit 10 with an ON/OFF operation of the FETs 29e, and to control the rotation of the armature 18 of the motor unit 10 in a forward direction and a reverse direction. Furthermore, on the control board 29c, a temperature detecting part not shown in the drawing is disposed, thereby detecting the temperature of the control board 29c.

When load is applied to the wiper motor 1 and the temperature of the control board 29c detected by the temperature detecting part becomes equal to or higher than a predetermined temperature, based on a signal from the temperature detecting part indicating that the temperature becomes equal to or higher than the predetermined temperature, the control board 29c causes the rotation numbers to be decreased, and even further, causes the rotation of the armature 18 to stop, thereby achieving protection of the control board 29c of the wiper motor 1 by the temperature detecting part.

Also, on a surface near the FETs 29e of the speed reduction mechanism accommodating part 26f, a FET heat dissipating part 26m is formed. The FET heat dissipating part 26m protrudes from the bottom surface of the speed reduction mechanism accommodating part 26f toward an opening direction, and is formed near a back surface of the control board 29c to which the FETs 29e are fixed. On the FET heat dissipating part 26m, a FET heat dissipating member 30 made of gel type material with high heat conductivity is mounted so as to fill a gap between the control board 29c and the FET heat dissipating part 26m. Heat generated from the FETs 29e is transmitted via the control board 29c and the FET heat dissipating member 30 to the FET heat dissipating part 26m, and is dissipated from the second heat sink 26j and the third heat sink 26k, formed on the outer peripheral surface of the gear housing 26 to the outside of the gear housing. With this, an increase in temperature of the control board 29c due to heating of the FETs 29e can be suppressed. For this reason, the wiper motor 1 can be actuated for a longer time.

Furthermore, between the worm wheel part 25a accommodated in the speed reduction mechanism accommodating part 26f and the control board 29c, a control board cover 31 made of insulating material is mounted on the gear housing cover 29. The control board cover 31 is disposed between the worm wheel part 25a and the control board 29c, and is fixed so that grease applied to the speed reduction mechanism unit 25 is not adhered to the control board 29c.

When the wiper device is actuated for a long period of time, the brushes 20 and 20, the motor unit 10, and the FETs 29e generate heat, thereby possibly preventing continuous actuation of the wiper device. For this reason, in the present invention, the second heat sink 26j and the third heat sink 26k are further formed near the first heat sinks 26i on the outer peripheral surface of the gear housing 26 so as to extend outward (on a side opposite to the gear housing cover 29). The plurality of FETs 29e are disposed near the second heat sink 26j and the third heat sink 26k across the control board 29c. With this, heat generated from the FETs 29e is dissipated via the control board 29c from the second heat sink 26j and the third heat sink 26k to the outside of the gear housing 26.

As described above, in the above embodiment, a case where the present invention is applied to a wiper motor having connecting lines has been described. However, the present invention is not meant to be restricted to this embodiment, and can be applied to a motor with speed reduction mechanism in general, the motor having a brush accommodated in a gear housing formed into an elliptical shape, and a structure in which a heat sink is disposed on an outer peripheral surface of the gear housing in the vicinity of the brush.

The motor with speed reduction mechanism is used as a driving source of a wiper device mounted on a vehicle such as an automobile, and used to wipe out rainwater and others attached onto a windshield by swing the wiper arm.

While the present invention has been illustrated and described with respect to a particular embodiment thereof, it should be appreciated by those of ordinary skill in the art that various modifications to this invention may be made without departing from the spirit and scope of the present.

What is claimed is:

1. A controlled motor with speed reduction mechanism, comprising:
   a reversible electric motor;
   a speed reduction mechanism which is driven by the electric motor to reduce a rotation of the electric motor; and
   a control board which controls the rotation of the electric motor, wherein
   the electric motor has:
   a cylindrical yoke;
   four magnets arranged in a cylindrical shape on an inner surface of the yoke so that magnetic poles thereof are arranged so as to be alternate with each other;
   an armature accommodated in the yoke, the armature having: an armature shaft rotatably supported by the yoke; a worm part provided to the armature shaft; a commutator fixed to the armature shaft, the commutator having pairs of segments, two segments of each pair being disposed so as to face each other; an armature core fixed to the armature shaft, and provided with teeth parts, the number of the teeth parts being the same as that of the segments; winding wires wound around the teeth parts of the armature core in a predetermined manner; and connecting members, each of which is electrically connected to a corresponding pair of segments facing each other; and
   a brush holder unit having: a first brush slidably contacting with the segments; a second brush slidably contacting with the segments, and disposed so that the second brush is separated from the first brush by an angle of substantially 90 degrees; a base part formed with an opening portion through which the armature shaft extends, the first and second brushes being disposed in the base part; and a pair of first terminals electrically connected to the first and second brushes, and disposed in the base part,
   the speed reduction mechanism has:
   a reduction mechanism unit which reduces the rotation of the armature, the speed reduction mechanism being composed of: a worm wheel part meshed with the worm part; and an output shaft functioning as a rotating shaft of the worm wheel part;
   a gear housing coupled to the yoke, the gear housing being composed of: a brush holder housing accommodating part in which the brush holder unit is accommodated, and which has a wall formed with a through hole through which the pair of first terminals extends; and a speed reduction mechanism accommodating part continuous from the brush holder housing accommodating part, and formed with an opening in which the speed reduction mechanism unit, the worm part, and the pair of first terminals are disposed, and
   a gear housing cover for covering the opening of the speed reduction mechanism accommodating part, the gear housing cover having a pair of second terminals which is electrically connected to the pair of first terminals, the control board is fixed to the gear housing cover, electrically connected to the second terminals, and housed in the speed reduction mechanism accommodating part, and a plurality of field effect transistors (FETs) for driving and controlling the rotation of the armature is mounted on a first surface of the control board, when viewed along a rotation center of the armature shaft, the first and second brushes are disposed on a half portion of the base part of the brush holder unit, and the pair of first terminals is disposed on the remaining half portion of the base part of the brush holder unit, said remaining half portion of the base part of the brush holder unit is closer to the control circuit, the opening portion of the brush holder unit is formed between the first and second brushes and the pair of first terminals in the base part of the brush holder unit.

2. The controlled motor with speed reduction mechanism according to claim 1, wherein when viewed along the rotation center of the armature shaft, each of the first and second brushes is disposed on a circle centered on the rotation center of the armature shaft, and inclined at an angle of 45 degrees with respect to a straight line parallel to the output shaft.

3. The controlled motor with speed reduction mechanism according to claim 1, wherein the pair of first terminals extend so as to penetrate through the base part.

4. The controlled motor with speed reduction mechanism according to claim 1, wherein when viewed along the rotation center of the armature shaft, the pair of first terminals is symmetrically disposed with respect to a straight line parallel to the output shaft, when viewed along the rotation center of the armature shaft, the first and second brushes are symmetrically disposed with respect to the straight line parallel to the output shaft.

5. The controlled motor with speed reduction mechanism according to claim 1, wherein the first brush is electrically connected to one of the first terminals through a first choke coil, and the second brush is electrically connected to the other of the first terminals through a second choke coil.

6. The controlled motor with speed reduction mechanism according to claim 5, wherein the first brush is electrically connected to the first choke coil through a first pigtail, and the second brush is electrically connected to the second choke coil through a second pigtail.

7. The controlled motor with speed reduction mechanism according to claim 5, wherein the opening portion of the brush holder unit is formed between the first choke coil and the second choke coil in the base part of the brush holder unit.

8. The controlled motor with speed reduction mechanism according to claim 1, which is a wiper motor to be applied to a wiper apparatus for wiping off a windshield of a vehicle.

9. A controlled motor with speed reduction mechanism, comprising:

a reversible electric motor;

a speed reduction mechanism which is driven by the electric motor to reduce a rotation of the electric motor; and a control board which controls the rotation of the electric motor, wherein the electric motor has:

a cylindrical yoke;

a plurality of magnets arranged in a cylindrical shape on an inner surface of the yoke so that magnetic poles thereof are arranged so as to be alternate with each other;

an armature accommodated in the yoke, the armature having: an armature shaft rotatably supported by the yoke; a worm part provided to the armature shaft; a commutator fixed to the armature shaft; an armature core fixed to the armature shaft, and provided with teeth parts; winding wires wound around the teeth parts of the armature core in a predetermined manner; and connecting members; and a brush holder unit having: a first brush slidably contacting with the segments; a second brush slidably contacting with the segments, and disposed so that the second brush is separated from the first brush by an angle of substantially 90 degrees; a base part formed with an opening portion through which the armature shaft extends, the first and second brushes being disposed in the base part; and a pair of first terminals electrically connected to the first and second brushes, and disposed in the base part so as to extend through the base part, the speed reduction mechanism has:

a reduction mechanism unit which reduces the rotation of the armature, the speed reduction mechanism being composed of: a worm wheel part meshed with the worm gear part; and an output shaft functioning as a rotating shaft of the worm wheel part;

a gear housing coupled to the yoke, the gear housing being composed of: a brush holder housing accommodating part in which the brush holder unit is accommodated, and which has a wall formed with a through hole through which the pair of first terminals extends; and a speed reduction mechanism accommodating part continuous from the brush holder housing accommodating part, and formed with an opening in which the speed reduction mechanism unit, the worm part, and the pair of first terminals are disposed, and a gear housing cover for covering the opening of the speed reduction mechanism accommodating part, the gear housing cover having a pair of second terminals which is electrically connected to the pair of first terminals, the control board is fixed to the gear housing cover, electrically connected to the second terminals, and housed in the speed reduction mechanism accommodating part, and a plurality of field effect transistors (FETs) for driving and controlling the rotation of the armature is mounted on a first surface of the control board, when viewed along a rotation center of the armature shaft, the first and second brushes are disposed on a half portion of the base part of the brush holder unit, and the pair of first terminals is disposed on the remaining half portion of the base part of the brush holder unit, said remaining half portion of the base part of the brush holder unit is closer to the control circuit, the opening portion of the brush holder unit is formed between the first and second brushes and the pair of first terminals in the base part of the brush holder unit.

10. The controlled motor with speed reduction mechanism according to claim 9, wherein when viewed along the rotation center of the armature shaft, each of the first and second brushes is disposed on a circle centered on the rotation center of the armature shaft, and inclined at an angle of 45 degrees with respect to a straight line parallel to the output shaft.

11. The controlled motor with speed reduction mechanism according to claim 9, wherein the pair of first terminals extend so as to penetrate through the base part.

12. The controlled motor with speed reduction mechanism according to claim 9, wherein
- when viewed along the rotation center of the armature shaft, the pair of first terminals is symmetrically disposed with respect to a straight line parallel to the output shaft,
- when viewed along the rotation center of the armature shaft, the first and second brushes are symmetrically disposed with respect to the straight line parallel to the output shaft.

13. The controlled motor with speed reduction mechanism according to claim 9, wherein the first brush is electrically connected to one of the first terminals through a first choke coil, and the second brush is electrically connected to the other of the first terminals through a second choke coil.

14. The controlled motor with speed reduction mechanism according to claim 13, wherein the first brush is electrically connected to the first choke coil through a first pigtail, and the second brush is electrically connected to the second choke coil through a second pigtail.

15. The controlled motor with speed reduction mechanism according to claim 13, wherein the opening portion of the brush holder unit is formed between the first choke coil and the second choke coil in the base part of the brush holder unit.

16. The controlled motor with speed reduction mechanism according to claim 9, which is a wiper motor to be applied to a wiper apparatus for wiping off a windshield of a vehicle.

\* \* \* \* \*